United States Patent [19]
King

[11] Patent Number: 5,974,950
[45] Date of Patent: Nov. 2, 1999

[54] ELECTRONIC CODED COFFEE PACKETS SEALED IN A GAS FLUSHED ENVELOPE, A BEVERAGE BREWING MACHINE USING SAME AS WELL AS A METHOD FOR BREWING

[75] Inventor: Alan M. King, Montreal, Canada

[73] Assignee: Innovations AMK, Inc., Canada

[21] Appl. No.: 09/138,859

[22] Filed: Aug. 24, 1998

Related U.S. Application Data

[63] Continuation-in-part of application No. 08/937,068, Sep. 24, 1997, abandoned.

[51] Int. Cl.⁶ .................................................. A47J 31/32
[52] U.S. Cl. ........................................ 99/289 R; 99/295
[58] Field of Search ................................ 99/295, 289 R, 99/290, 302 R; 426/433

[56] References Cited

U.S. PATENT DOCUMENTS

| | | |
|---|---|---|
| 3,122,988 | 3/1964 | Rota . |
| 3,143,954 | 8/1964 | Nesmith . |
| 3,208,369 | 9/1965 | Greenly et al. . |
| 3,209,676 | 10/1965 | Zimmermann et al. . |
| 3,552,976 | 1/1971 | King . |
| 3,565,641 | 2/1971 | King . |
| 4,353,293 | 10/1982 | Illy ............................................ 99/283 |
| 4,426,919 | 1/1984 | Rhoten .................................. 99/289 T |
| 4,632,023 | 12/1986 | King ...................................... 99/302 P |
| 4,791,859 | 12/1988 | King ..................................... 99/289 R |
| 4,903,586 | 2/1990 | King .......................................... 99/287 |
| 4,967,647 | 11/1990 | King .......................................... 99/280 |
| 4,974,751 | 12/1990 | King ....................................... 222/142 |
| 5,297,472 | 3/1994 | Suzuki et al. ......................... 99/289 T |
| 5,309,820 | 5/1994 | Baxter et al. .............................. 99/280 |
| 5,337,653 | 8/1994 | Sellers ................................... 99/289 R |
| 5,349,897 | 9/1994 | King et al. ............................ 99/289 R |
| 5,351,604 | 10/1994 | King et al. ............................ 99/289 R |
| 5,479,849 | 1/1996 | King et al. ................................ 99/287 |
| 5,515,772 | 5/1996 | De Groen ................................. 99/290 |
| 5,520,093 | 5/1996 | Ackermann ........................... 99/289 T |
| 5,642,655 | 7/1997 | King ..................................... 99/289 T |
| 5,697,288 | 12/1997 | King ..................................... 99/289 T |

FOREIGN PATENT DOCUMENTS

| | | | |
|---|---|---|---|
| 0 654 240 A1 | 5/1995 | European Pat. Off. ................. 99/290 |
| 101110 | 10/1958 | Norway ................................ 99/289 T |
| 2 250 426A | 6/1992 | United Kingdom . |
| 2 288 972 | 11/1995 | United Kingdom . |

*Primary Examiner*—Reginald L. Alexander
*Attorney, Agent, or Firm*—Brian M. Mattison; Patents & TMS, P.C.

[57] ABSTRACT

A beverage brewing machine, a method for brewing a beverage preparation material and a beverage brewing envelope are provided. The beverage brewing machine has an upper brewing chamber adapted to receive hot water and a beverage preparation material and having an open lower end. A cylinder with an upper end normally in registration with the open lower end of the upper brewing chamber is further provided. An envelope enclosing a packet is provided wherein the packet encloses the beverage preparation material. The customer may remove the packet from the envelope and place it on a carrier plate which automatically moves into brewing position and then is discarded by the customer, or, in a different execution, the carrier plate receives the envelope and extracts the packet including the beverage preparation material from the envelope and places the packet over the cylinder. Further, the packet may include a machine readable code such that a scanner associated with the machine is capable of scanning the code associated with the product.

5 Claims, 5 Drawing Sheets

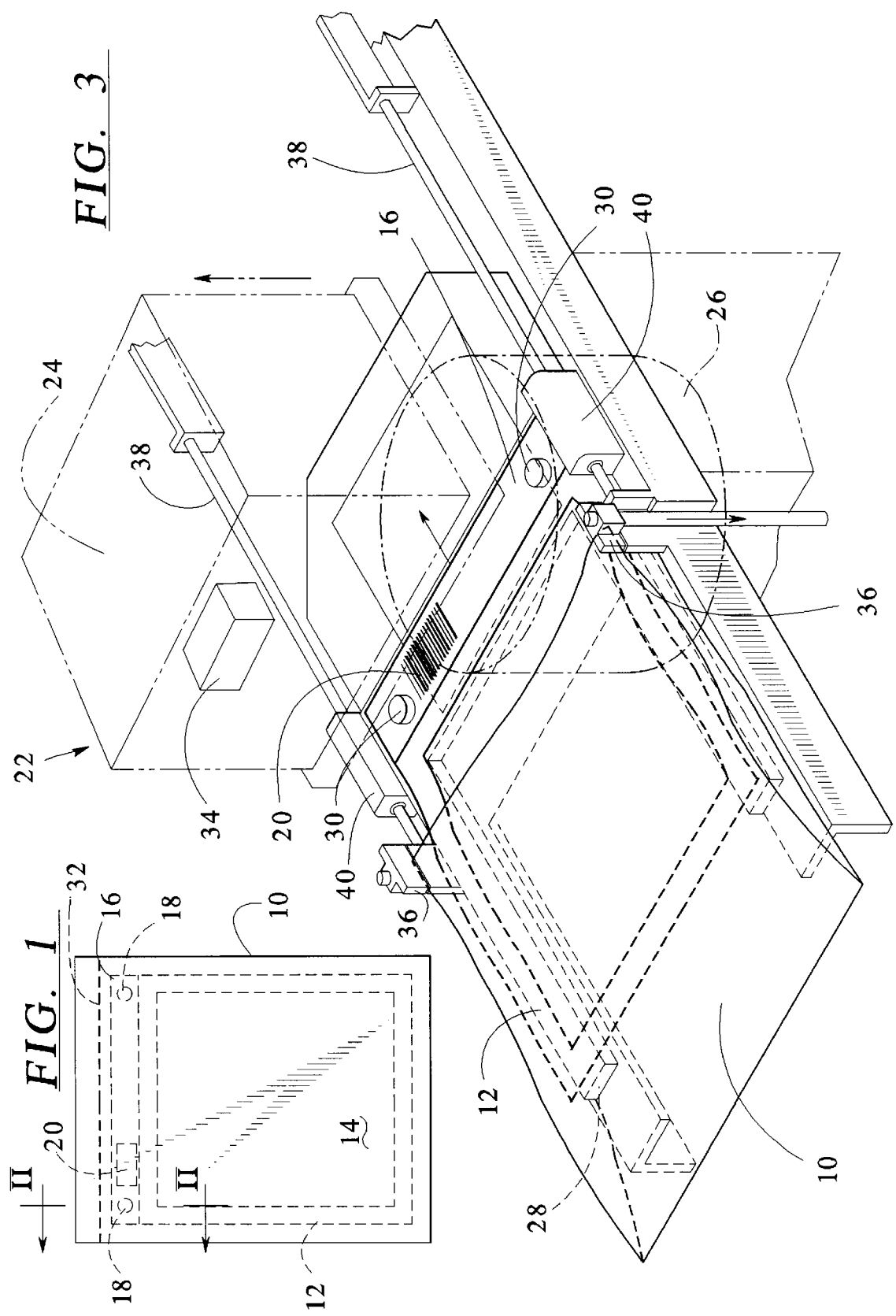

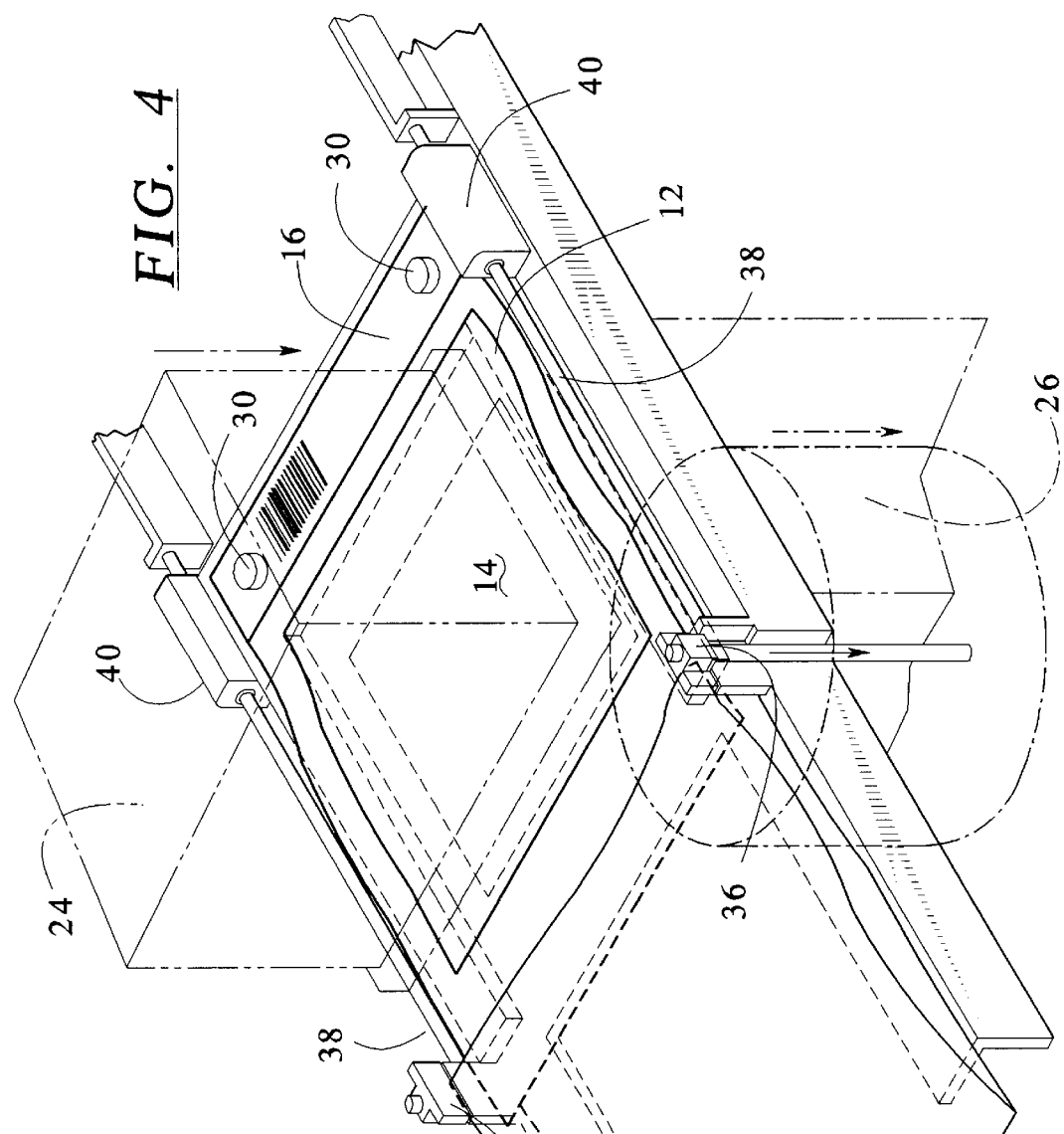
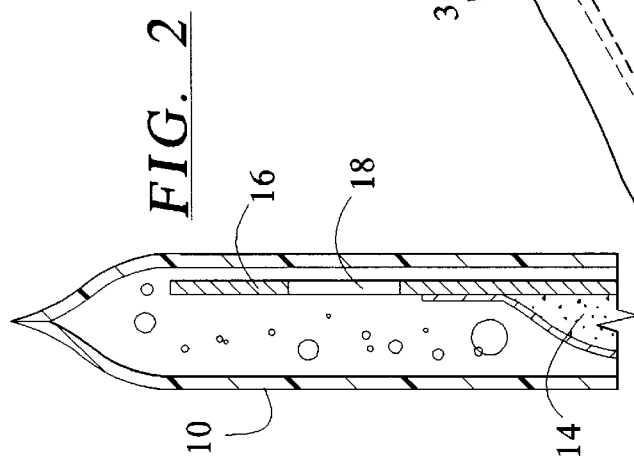

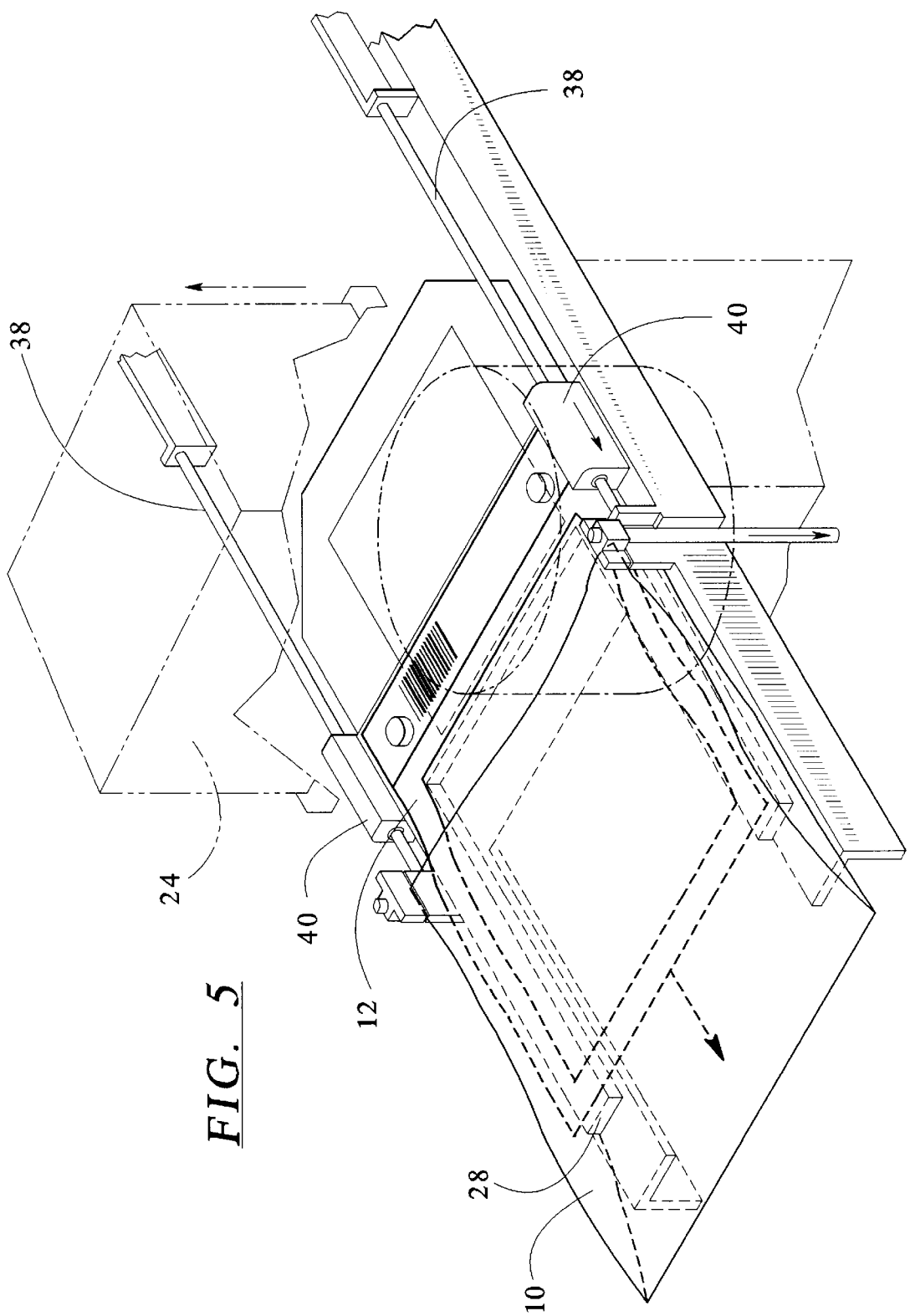

ELECTRONIC CODED COFFEE PACKETS SEALED IN A GAS FLUSHED ENVELOPE, A BEVERAGE BREWING MACHINE USING SAME AS WELL AS A METHOD FOR BREWING

RELATED APPLICATION DATA

This application is a continuation-in-part application of commonly assigned U.S. patent application Ser. No. 08/937,068, filed Sep. 24, 1997, now abandoned.

BACKGROUND OF THE INVENTION

The present invention generally relates to a beverage brewing machine and a beverage preparation method. In addition,. the present invention further relates to a beverage brewing envelope for storing and brewing a "packet" of beverage preparation material for a single cup of beverage. Preferably, the packet is stored within the envelope. Further, preferably, the envelope and/or packet includes a machine readable code.

It is, of course, generally known to brew beverages, such as coffee, tea, or the like. To brew, for example, coffee, a filter or packet that includes coffee is typically placed in a machine and a brewing process begins. Once the process is completed, the filter containing the brewed coffee is wet and is easily removed from the brewing device and discarded.

Further, often inappropriate filters including beverage preparation material, such as coffee, are placed within a beverage brewing machine. Therefore, it is important to provide a device or brewing machine that first prevents inappropriate packets from being used within the machine as well as a device that, as much as possible, eliminates handling of a beverage preparation material packet, both before and after the brewing process.

SUMMARY OF THE INVENTION

The present invention provides a beverage brewing machine, a method for brewing a beverage preparation material, and a beverage brewing envelope for use therewith that overcomes the deficiencies of known machines, methods and packets, respectively.

To this end, in an embodiment, the present invention provides a beverage brewing machine having an upper brewing chamber adapted to receive hot water and a beverage preparation material and having an open lower end. A cylinder is provided with an open upper end normally in registration with the open lower end of the upper brewing chamber. An envelope encloses a packet and the packet encloses the beverage preparation material. In addition, a carrier plate is provided that receives the envelope and extracts the packet including the beverage material from the envelope wherein the carrier plate places the packet over the cylinder.

In an embodiment, a strip may be connected to the envelope. At least one pin is associated with the carrier plate capable of engaging a hole in the strip or a hole in the envelope.

In an embodiment, the packet is removed from the envelope and placed on the carrier plate which plate then places the package in the brewing position. Following the brewing of the beverage, the carrier plate removes the packet from the brewing position and replaces the used packet in the envelope.

In an embodiment, a scanning means capable of scanning a machine readable code on the envelope and/or the packet is provided.

In another embodiment of the present invention, a method for brewing a beverage preparation material is provided. The method comprises the steps of: providing an envelope and inserting the packet into the envelope; placing the packet on a carrier plate wherein carrier plate inserts the envelope into a beverage brewing machine; automatically removing the packet from the envelope; and brewing the beverage preparation material in the beverage brewing machine without interference from the envelope.

In an embodiment, the method provides the step of automatically returning the packet into the envelope.

In an embodiment, the method provides the step of removing the envelope including the packet within the envelope from the carrier plate.

In an embodiment, the method provides the step of providing at least one pin associated with the carrier plate wherein the at least one pin engages the packet to remove the packet from the envelope.

In an embodiment, the method provides the step of scanning a machine readable code associated with the envelope and/or the packet.

In an embodiment, the envelope is cut along a fold line to provide access to the packet.

In another embodiment of the present invention, a beverage brewing envelope is provided. The beverage brewing envelope has a compartment defining an interior and a packet having an interior holding a beverage preparation material wherein the packet may include a strip attached to the packet. The strip of the packet is engageable by a means to remove the packet from the interior of the compartment and replace the packet in the interior of the compartment following brewing of the beverage preparation material. However, if no strip is used, one or more holes punched in the sealed area at the end of the packet may be engaged to remove the fresh packet from the interior and reinsert the now used packet in the interior of the compartment.

In an embodiment, a hole is provided in the strip of the packet for engagement by a pin to remove and replace the packet from the interior of the compartment.

In an embodiment, a machine readable code is provided on the compartment and/or the packet.

In an embodiment, a fold line extends across the compartment wherein the compartment is foldable along the fold line, and an exterior end of the compartment is secured against an exterior wall of the compartment forming a loop section.

In an embodiment, a clearance area is provided in the interior of the compartment. A fold line extends across the clearance area of the compartment.

It is, therefore, an advantage of the present invention to provide a beverage brewing machine, a method for brewing a beverage preparation material and a beverage brewing envelope that is simple to implement.

Another advantage of the present invention is to provide a beverage brewing machine, a method for brewing a beverage preparation material and a beverage brewing envelope that completes a beverage brewing process without having to contact a packet containing the beverage preparation material.

Another advantage of the present invention is to provide a beverage brewing machine, a method for brewing a beverage preparation material and a beverage brewing envelope that has a code and code reading means associated with the machine for scanning the code and identifying the packet.

These and other advantages of the present invention are described in, and will be apparent from, the detailed description of the presently preferred embodiments and from the drawings.

BRIEF DESCRIPTION OF THE DRAWINGS

FIG. 1 illustrates a plan view of an embodiment of an envelope including a packet containing a beverage preparation material therein.

FIG. 2 illustrates a partial cross-sectional view of an embodiment of the envelope including a packet taken generally along the line II—II of FIG. 1.

FIG. 3 illustrates a perspective view of an embodiment of a beverage brewing machine having a carrier plate for receiving a beverage brewing envelope having a packet therein containing a beverage preparation material in a first or loading step of the present invention.

FIG. 4 illustrates a perspective view of an embodiment of a beverage brewing machine having a carrier plate for receiving a beverage brewing envelope having a packet therein containing a beverage preparation material in a second or brewing step of the present invention.

FIG. 5 illustrates a perspective view of an embodiment of a beverage brewing machine having a carrier plate for receiving a beverage brewing envelope having a packet therein containing a beverage preparation material in a third step following brewing.

DETAILED DESCRIPTION OF THE PRESENTLY PREFERRED EMBODIMENTS

Figure 7:
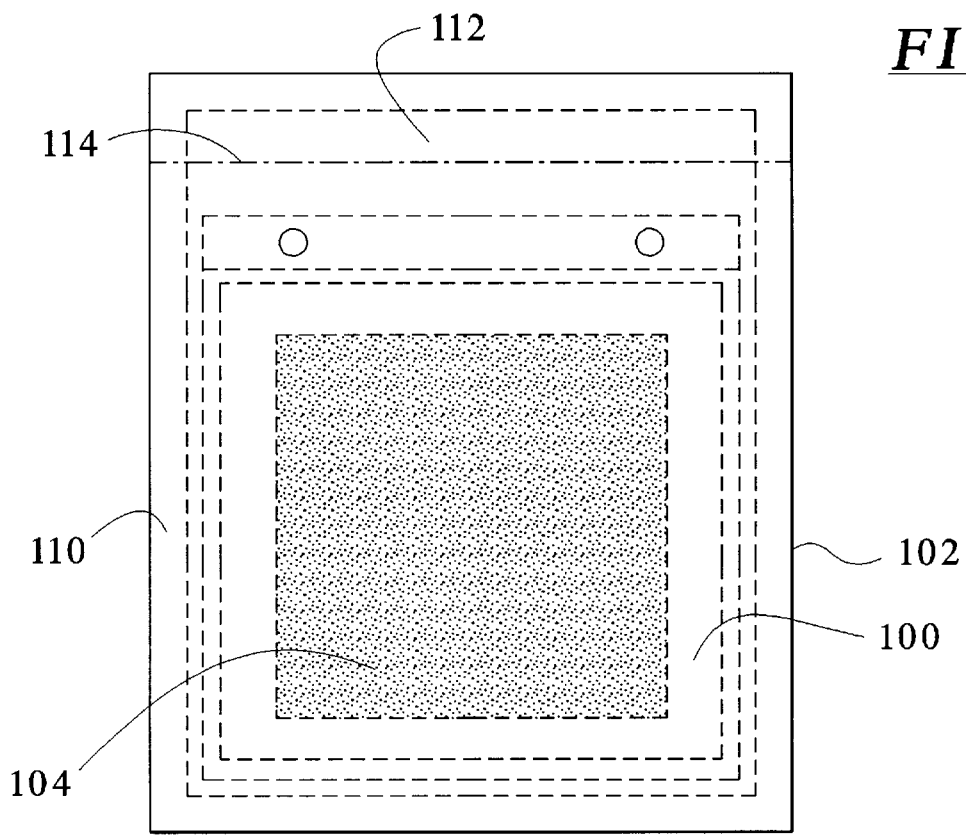
FIG. 7 illustrates a plan view of an alternate embodiment of an envelope including the packet shown in FIG. 6.

Referring now to the drawings wherein like numerals refer to like parts, FIGS. 1 and 2 generally illustrate an envelope 10 having a packet 12 therein. The packet 12 includes a beverage preparation material 14, such as coffee, tea, or the like. The beverage preparation material 14 is contained within the packet 12 which, preferably, is gas flushed. The packet 12 is initially sealed within the envelope 10. A strip 16 may be located at one end of the packet 12. Preferably, the strip 16 is made from, for example, cardboard, and includes a first and second aperture 18 therethrough. However, it may be possible to merely punch suitably located holes at the end of the packet where the material is sealed. On the strip 16, a bar code or other machine readable code 20 may be incorporated. Of course, the machine readable code 20 may be incorporated on other areas of the packet 12 or the envelope 10 as may be implemented by one of ordinary skill in the art.

Referring now to FIGS. 3–5, use of the envelope 10 and packet 12 within a beverage brewing machine 22 is generally illustrated. The beverage brewing machine 22 includes a brew chamber 24 typically filled with hot water when a beverage is being brewed and a main cylinder 26. A carrier plate 28 is provided to receive the envelope 10 including the packet 12 and to position the packet 12 at a position on top of the main cylinder 26 as generally illustrated in FIG. 4.

To this end, associated with the carrier plate 28 are pins 30 that align with the apertures 18 of the packet 12 holding the beverage preparation material 14. To access the packet 12, the envelope 10 may be opened at a perforated tear line 32 by a user. The packet 12 may be slightly removed from the envelope 10 such that the apertures 18 may be placed over the pins 30 thereby allowing the carrier plate 28 to remove the packet 12 from the envelope 10. This step can take place either manually or automatically. Of course, other means may be implemented by those skilled in the art, such as a gripping member, that grips the strip 16 and pulls and pushes the packet 12 out of and into the envelope 10, respectively.

As the carrier plate 20 is shifted from a first position illustrated in FIG. 3 to a second position illustrated in FIG. 4, a scanner 34 associated with the beverage brewing machine 22 reads the machine readable code 20 on the packet 12. The scanner 34 sends a signal to a processor to determine if the packet 12 is acceptable for use with the beverage brewing machine 22. Alternatively, the scanner 34 may sense other information associated with the beverage packet, beverage preparation material or the like, for example, the freshness of the beverage preparation material within the packet 12 may also be determined.

As illustrated, the envelope 10 containing the packet 12 is held in an open position by grippers 36. The grippers 36 allow the insertion of the carrier plate 28 into the envelope 10 for removal of the packet 12 therefrom.

In an embodiment, rails 38 are provided on which a transfer mechanism 40 is provided for actuating movement of the carrier plate 28 from the position shown in FIG. 3 to the position shown in FIG. 4 and back to the position shown in FIG. 5. After the packet 12 is transferred on the carrier plate 28 to the position shown in FIG. 4, the brew chamber 24 is clamped to the top of the packet 12 which is on top of the main cylinder 26. A brewing process may begin to brew the beverage preparation material 14 contained within the packet 12 by the cylinder 26 which first, as the piston is in the lowest required position, the piston is then moved upward so that the air between the piston and the packet 12 is forced through the brew chamber 24 so that the soluble portion of the beverage is dissolved. When the piston reaches top dead center, its direction is reversed, drawing hot water from the chamber 24 through the packet 12 including the beverage preparation material 14.

Finally, as illustrated in FIG. 5, when the brew process is complete, the carrier plate 28 is reversed. To this end, the brew chamber 24 is moved off the packet 12 (or out of the brew position) such that the packet 12 may be reinserted into the envelope 10 by transposing the carrier plate 28 into the first position generally shown and described with reference to FIG. 3. In this manner, a customer using the machine 22 does not have to handle a wet packet following the brewing process, but merely removes and disposes of the envelope 10 in which the used packet 12 has been received following brewing. Of course, a simpler embodiment may be employed whereby a customer merely removes the spent, used packet and disposes of same, as it is damp but quite dry.

Figure 6:
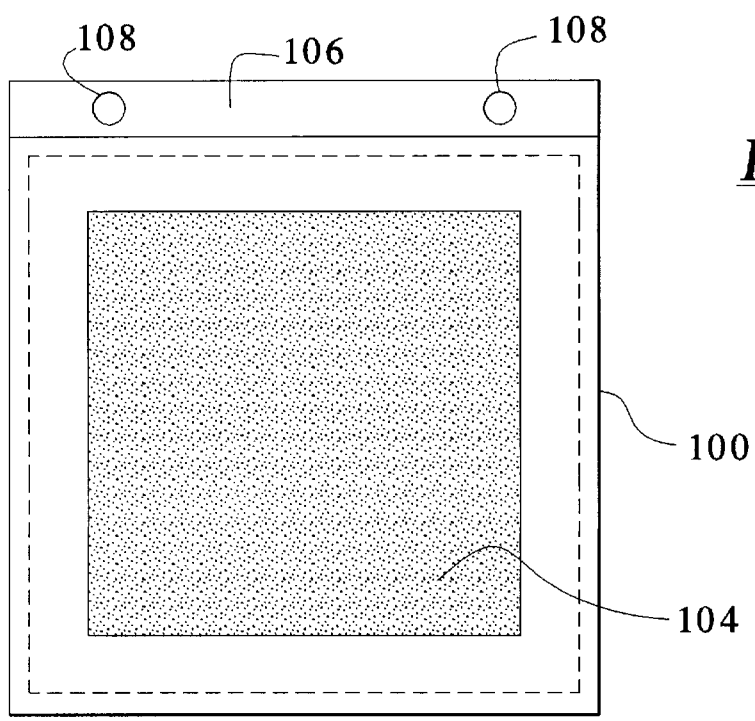
FIG. 6 illustrates a plan view of an alternate embodiment of a packet including a beverage preparation material.

Referring now to FIGS. 6 and 7, a single serving beverage packet is illustrated in FIG. 6 at 100 and the incorporation of the packet 100 into a gas-flushed envelope 102 is illustrated in FIG. 7. Within the packet 100, are, for example, coffee grounds 104. Of course, other types of beverages, such as tea or the like, may be replaced in the packet 100 as desired. A top end 106 of the packet 100 is sealed, and punched holes 108 are provided to use the packet 100 as shown and described with reference to FIG. 3–5.

The beverage packet 100 is insertable in the gas-flushed envelope 102. The gas-flushed envelope 102 is peripherally sealed in an area 110 to maintain the packet 100 in a sealed environment. Additional space or clearance area 112 is provided at one end of the envelope 102, and a fold line 114 is provided in the clearance area 112. The fold line 114 extends across a width of the envelope 102.

Figure 8:
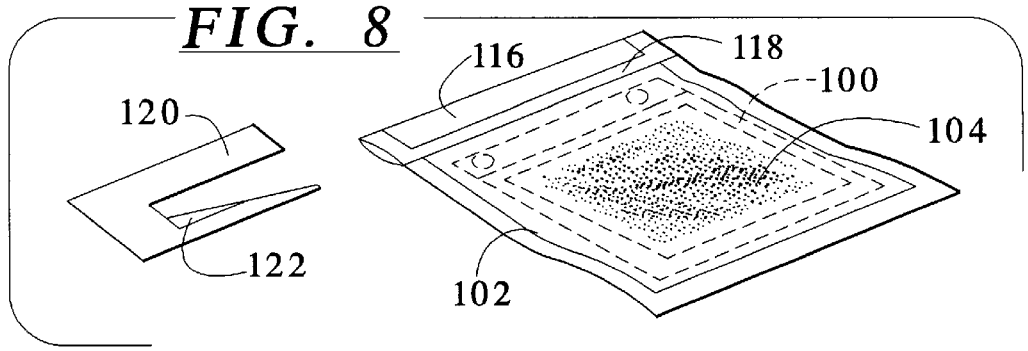
FIGS. 8–11 illustrate perspective views of steps using the bag and the envelope illustrated in FIGS. 6 and 7.

Referring to FIGS. 8–11, use of the envelope 102 containing the packet 100 is generally illustrated. To this end, the envelope 102 during manufacture is folded at the fold line 114, and a looped end 116 is created when an end 118 of the envelope 102 is tacked or otherwise secured in place onto a side of the envelope 102 as generally illustrated in FIG. 8. An opener 120 with incorporated razor blade 122 which is fastenable to, for example, a side of the beverage maker, is used to open the envelope 102 and remove the packet 100 therefrom.

Figure 9:
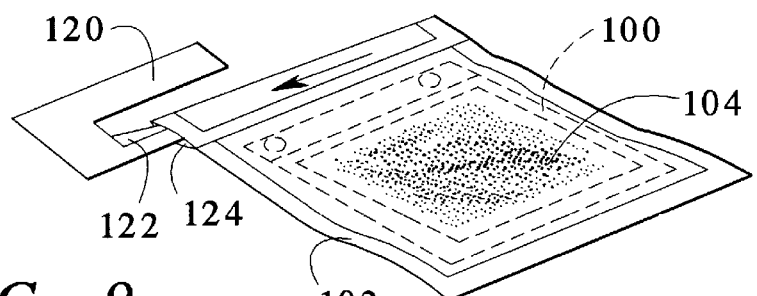
Figure 10:
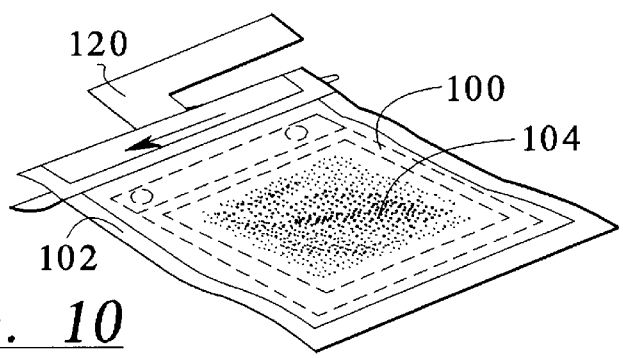
Figure 11:
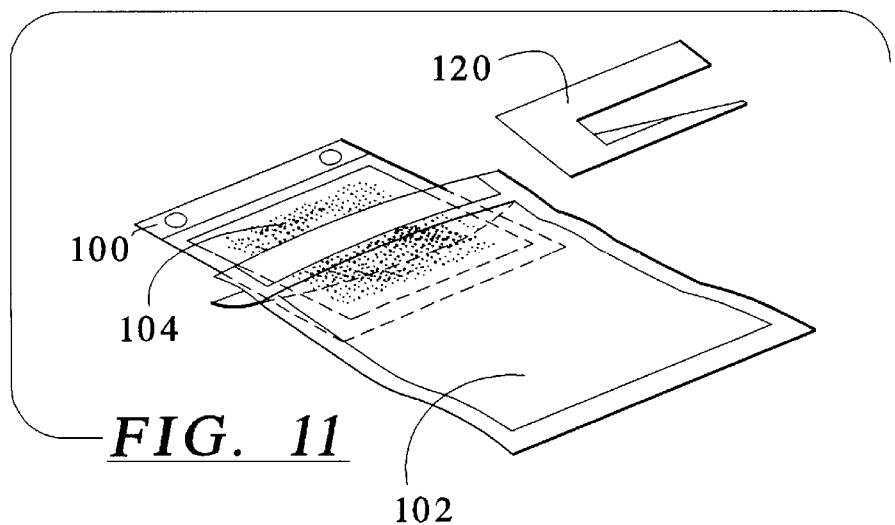

To this end, the opener 120 is placed into the loop area 124 as shown in FIG. 9, and the opener 120 begins cutting a side of the loop area 124 open as the cutter 120 extends across the envelope 102 as shown in FIG. 10 thereby opening the envelope 102. As a result, the hermetic seal is broken, and a customer may then remove the packet 100 including the coffee grounds 104 contained therein. The envelope 102 may then be used following removal from the packet 100 in a beverage maker, such as a coffee brewer, as previously described with reference to FIGS. 3–5.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A beverage brewing machine comprising:

an upper brewing chamber adapted to receive hot water and a beverage preparation material and having an open lower end;

a cylinder with an open upper end normally in registration with the open lower end of the upper brewing chamber;

an envelope enclosing a packet, the packet enclosing the beverage preparation material; and a carrier plate that receives the envelope with a holding means associated with the carrier plate capable of holding the packet wherein the carrier plate extracts the packet including the beverage preparation material and places the packet over the cylinder.

2. The beverage brewing machine of claim 1 further comprising:

a strip connected to one end of the envelope; and at least one pin associated with the carrier plate capable of engaging the envelope when the carrier plate is fully inserted into the envelope.

3. The beverage brewing machine of claim 1 further comprising:

a fold in the envelope at the end opposite to where the strip is fastened so that when the carrier plate is fully inserted into the envelope, the carrier plate rests under that fold when the strip is engaged; or a second strip which is connected to the end opposite to where the first strip is fastened so that when the carrier plate is fully inserted into the envelope the carrier plate rests under this second strip.

4. The beverage brewing machine of claim 1 wherein the carrier plate can re-insert the packet into the envelope after brewing of the beverage preparation material.

5. The beverage brewing machine of claim 1 further comprising:

scanning means capable of scanning a machine readable code on the envelope and/or the packet.

* * * * *